(12) United States Patent
Raber

(10) Patent No.: US 8,210,736 B2
(45) Date of Patent: Jul. 3, 2012

(54) METHOD AND APPARATUS FOR MIXING AND DISPENSING PRODUCTS

(76) Inventor: Jeffrey C. Raber, Whittier, CA (US)

( * ) Notice: Subject to any disclaimer, the term of this patent is extended or adjusted under 35 U.S.C. 154(b) by 463 days.

(21) Appl. No.: 12/583,286

(22) Filed: Aug. 17, 2009

(65) Prior Publication Data

US 2010/0049370 A1 Feb. 25, 2010

Related U.S. Application Data

(60) Provisional application No. 61/189,634, filed on Aug. 20, 2008.

(51) Int. Cl.
*B01F 7/28* (2006.01)
(52) U.S. Cl. ............ 366/143; 366/138; 366/160.1; 366/177.1; 366/181.7
(58) Field of Classification Search .......... 366/143, 366/138, 177.1, 181.7, 160.1
See application file for complete search history.

(56) References Cited

U.S. PATENT DOCUMENTS

| | | | | |
|---|---|---|---|---|
| 1,993,762 | A | * | 3/1935 | Tolman ............ 241/245 |
| 2,594,442 | A | | 4/1952 | Irwin |
| 3,207,486 | A | * | 9/1965 | Rosenthal ............ 366/138 |
| 3,608,870 | A | * | 9/1971 | Aldridge ............ 366/134 |
| 3,954,126 | A | | 5/1976 | Piana |
| 4,201,558 | A | | 5/1980 | Schwitters et al. |
| 5,292,030 | A | | 3/1994 | Kateman et al. |
| 5,575,405 | A | | 11/1996 | Stratton et al. |
| 6,059,145 | A | | 5/2000 | Stratton et al. |

* cited by examiner

*Primary Examiner* — David Sorkin
(74) *Attorney, Agent, or Firm* — James E. Brunton

(57) ABSTRACT

An improved post-mix type food product dispenser that includes a housing having a clear, transparent visual display that permits real-time viewing of the mixing process that takes place within a mixing chamber defined by a rotating rotor that is closely received within the housing. The apparatus is operated by the customer and uniquely produces and dispenses on demand individualized portions of freshly prepared food products as selected by the customer.

5 Claims, 2 Drawing Sheets

METHOD AND APPARATUS FOR MIXING AND DISPENSING PRODUCTS

CROSS-REFERENCE TO RELATED APPLICATIONS

This is a Non-Provisional Application claiming the benefit of co-pending Provisional Application No. 61/189,634 filed Aug. 20, 2008.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to fluid dispensing apparatus. More particularly, the invention concerns an improved post-mix type food product dispenser having a clear, transparent visual display panel that enables real-time viewing of the mixing process.

2. Description of Related Art Including Information Disclosed Under 37 CFR 1.97 and 1.98

Many consumer food products are delivered to customers upon demand through the use of dispensers designed to provide the particular product of interest. Generally, these dispensers provide a means for preparing and storing the food product of interest and often display the finished product in a holding tank before being delivered to the customer through a simple dispensing mechanism.

Typically, the product to be delivered is a flavored beverage, sometimes partially frozen, and it is delivered through a "pre-mix" or "post-mix" dispenser. Pre-mix dispensers mix a syrup concentrate and a diluting solution, typically water, to create the finished product that is stored in a holding tank until it is dispensed through a spigot or faucet mechanism. Post-mix dispensers do not hold prepared product ready for delivery; instead, they provide a means for immediately combining the syrup concentrate and diluting solution on demand to deliver the product through the associated dispensing mechanism.

Pre-mix dispensers often provide a holding tank, typically opaque or transparent, that provides a visually appealing display of the product to be dispensed, imparting a feeling of freshness to the beverage to stimulate impulse purchases. Post-mix dispensers typically lack a means of displaying the product before consumption and, therefore, lose the powerful effect garnered from a visually appealing presentation of the consumable product.

While the holding tank offers powerful marketing advantages, these types of pre-mix dispensers often suffer from limited holding tank volumes and require frequent cleaning to remove bacterial induced organic growth. To circumvent this issue and still reap the benefits of a pre-mixed display, devices such as those disclosed in U.S. Pat. Nos. 5,575,405 and 6,059,145 have been created to provide a post-mix dispenser that presents a simulated pre-mix by way of presenting a permanent stable and sterile fluidized display.

In addition to flavored beverages, similar apparatuses exist to deliver frozen food products such as ice cream and yogurt to customers upon their demand. Typical dispensers for these types of products generally require the mixing of selected liquid ingredients with a particular volume of air followed by freezing the resulting mixture and subsequent dispensing of the final product. The final product feel and desirability is often directly related to the amount of air and manner in which it is introduced along with how the blended mixture is frozen to the desired temperature.

Typical semi-frozen dairy product dispensers deliver a liquid mix, containing such ingredients as cream, milk, condensed milk, syrup, etc. to a freezing chamber containing air or a non-toxic gas. In the freezing chamber the mixture is mixed with air by mechanical motion provided by blades or paddles while slowly being frozen to the desired temperature. The amount of aeration is extremely important and is defined for ice cream as overrun. The overrun is defined as the percentage of increase in the volume of ice cream greater than the amount of mix used to create that ice cream. Quality ice creams have lower overruns than those of reduced quality. Generally the more overrun, the lower the cost of the ice cream. Because of this, some states limit the amount of overrun acceptable in ice cream products. Slow freezing of the mixture can also lead to the formation of ice crystals and particles of various sizes that ultimately deplete the palatability of the resulting product.

It is common to utilize the freezing chamber to provide both a means for freezing and preparing the product along with acting as a reservoir to contain the product at the desired temperature until individual servings are dispensed. The product is often dispensed by way of pumping or extruding the product through a dispensing outlet connected to the freezing chamber into an appropriate container. Examples of such apparatuses are disclosed in U.S. Pat. Nos. 3,954,126 and 4,201,558. One major disadvantage to these types of dispensers is their plethora of wetted surfaces and moving parts, requiring diligent cleaning and maintenance. Cleaning of these types of systems is costly in terms of downtime and product loss and this unpleasant job is often difficult to get an employee to do properly and consistently.

Most people are accustomed to self-serve ice cream or frozen yogurt dispensers that provide two flavors at once, ultimately producing a product with a "twist" of flavor combinations. These combinations are a result of dispensers that employ two separate freezing chambers to prepare and contain the two different flavors of product to be dispensed. While these products are visually appealing, they present two unique flavors to the tongue as the product is tasted because the mixture is not homogeneous or completely mixed.

The prior art describes a few attempts to provide methods and apparatuses that enable the production and dispensing of semi-frozen aerated products on a continuous basis. Although U.S. Pat. Nos. 2,594,442 and 5,292,030 disclose two different approaches to provide product on a continuous operation, they both suffer from difficulty in controlling the amount of overrun and formation of frozen particles of uniform size, ultimately presenting a less-than-desirable product consistency.

BRIEF SUMMARY OF THE INVENTION

Accordingly, it is an object of the present invention to provide an improved post-mix type food product dispenser with a clear, transparent visual display of the mixing process with minimal maintenance and volume of product within the apparatus requirements.

Another object of the invention is to provide apparatus that is operated on demand through a simple touch screen interface.

A further object of the invention is to provide apparatus of the general type that is simple in construction and is easy to make and maintain.

Still another object of the invention is to provide apparatus for producing and dispensing individualized portions of freshly prepared food products on demand.

Yet another object of the invention is to provide apparatus of the general type that dispense multiple flavor combinations while occupying a relatively small amount of space.

Another object of the invention is to provide a method of producing mixed flavor food products that enable dispensing an individualized product on demand.

BRIEF DESCRIPTION OF SEVERAL VIEWS OF THE DRAWINGS

For a more thorough understanding of the nature and objects of the present invention, reference should be made to the following detailed description of one preferred embodiment of the invention in connection with the accompanying drawing in which.

It is to be understood that the invention is not limited in its application to the details of construction and arrangement of parts illustrated in the associated drawings, since the invention is capable of other embodiments and of being practiced in various manners, and that the terminology used herein is employed for the purpose of describing the invention claimed.

DETAILED DESCRIPTION OF INVENTION

Figure 1:
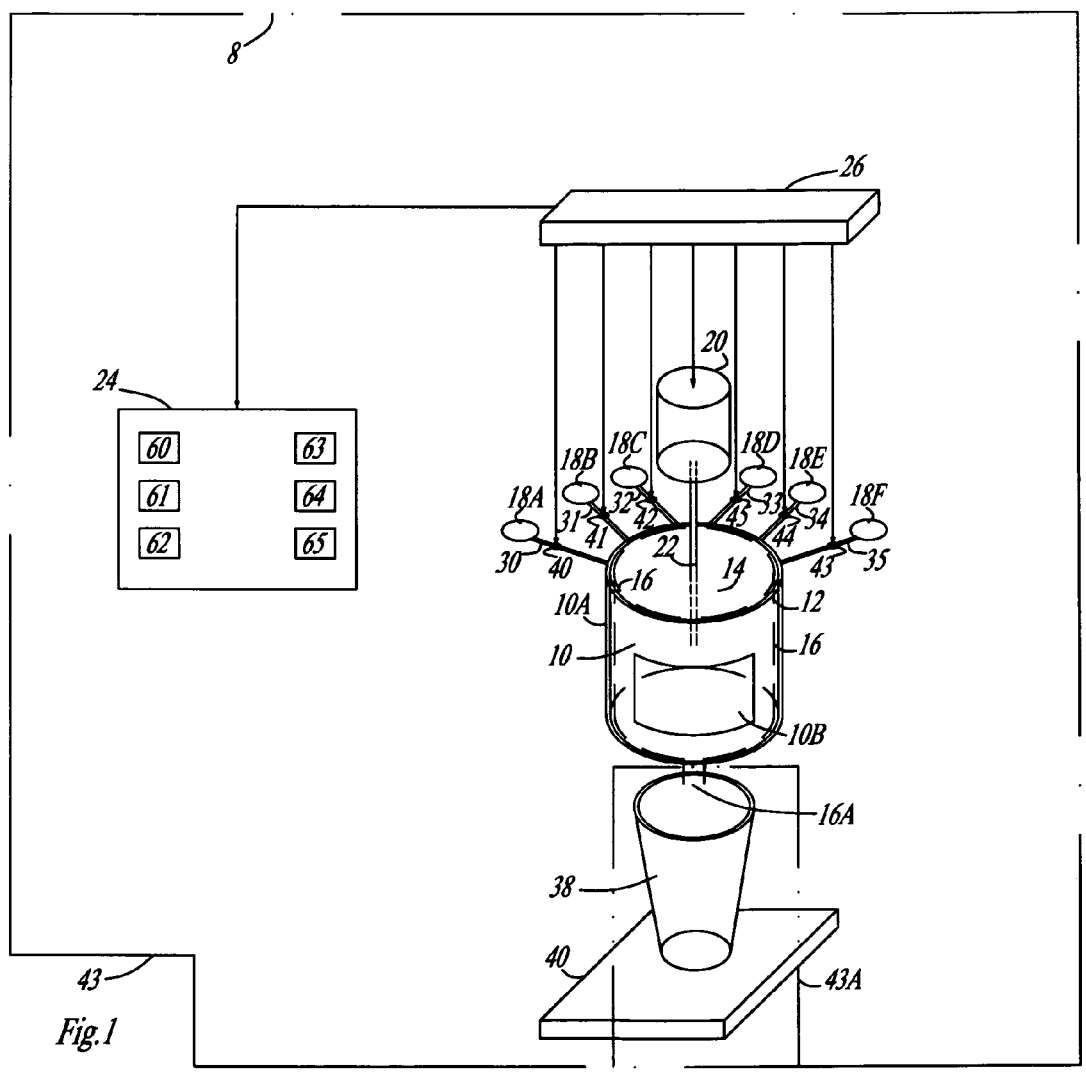
FIG. 1 is an isometric view of an apparatus for producing and dispensing a mixed food product according to this invention.
Figure 2:
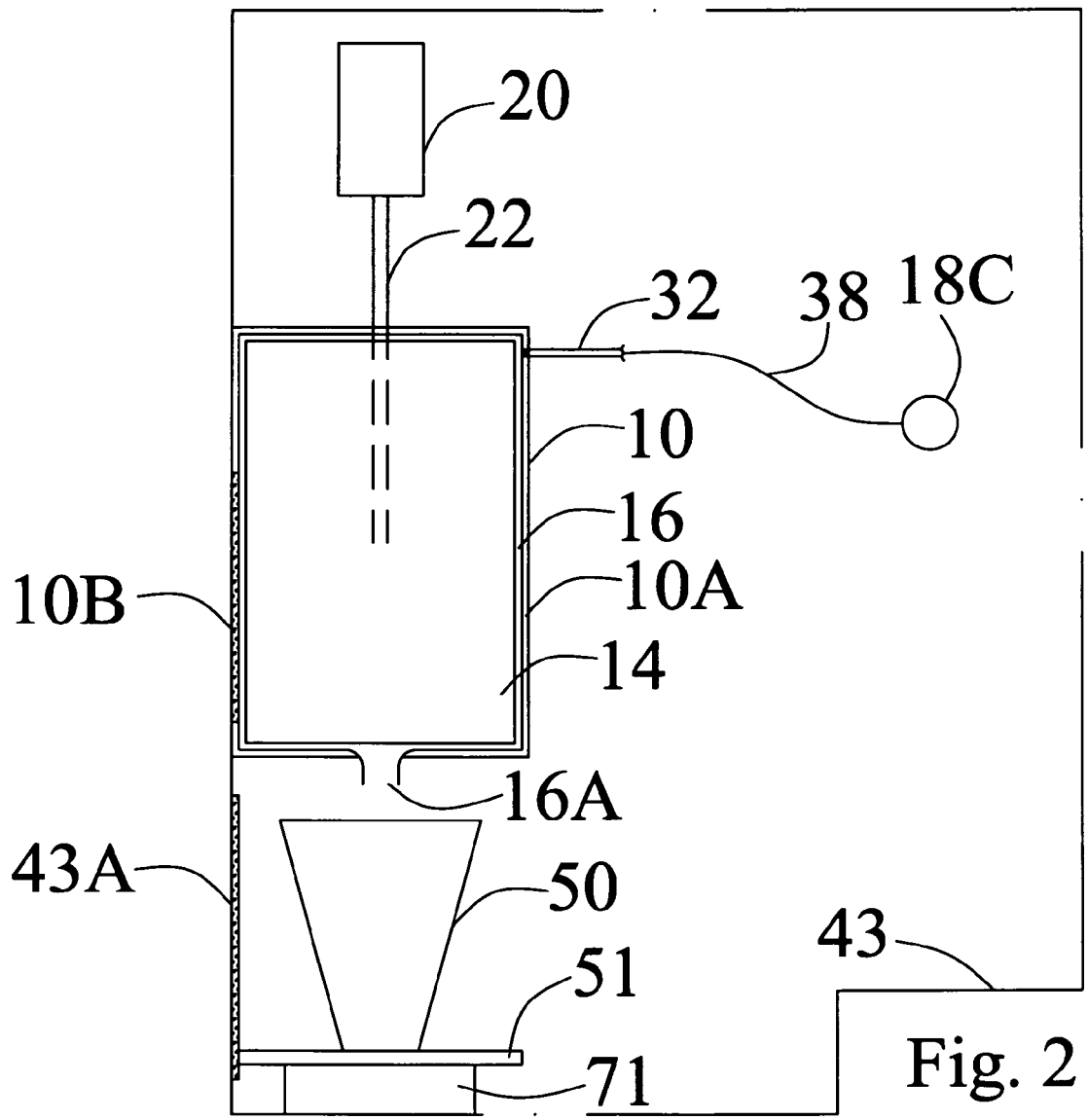
FIG. 2 is a fragmentary, longitudinal cross-sectional view of the mixing and dispensing portion of the apparatus illustrated in FIG. 1.

Referring to the drawings and particularly to FIG. 1, one form of the apparatus of the invention for mixing and dispensing consumable products, such as a fruit drink is there shown and generally designated by the 8. The apparatus here comprises a generally cylindrically shaped housing 10 having a wall 10a defining a generally cylindrically shaped interior chamber 12. For a purpose presently to be described, housing 10 is also provided with a visualization window 10b. Closely received within the interior chamber 12 for rotation there within is a generally cylindrically shaped rotor 14. As best seen in FIG. 2 of the drawings, rotor 14 cooperates with wall 10a to define an elongated mixing chamber 16 for mixing consumable materials contained within a source of consumable materials 18 to form a mixture of consumable materials. Uniquely, mixing chamber 16 is generally annular shaped in cross-section and has an outlet 16a for discharging therethrough the mixture of consumable materials.

Rotor 14 is controllably rotated within housing 10 by means of an electric motor 20. Electric motor 20 has a shaft 22 that is connected to rotor 14 in the manner shown in FIG. 2 of the drawings. Motor 20 is capable of high rotational speeds and is controlled by a conventional controller 26 of the character well known by those skilled in the art.

In one form of the apparatus of the invention, the mixing chamber 16 is approximately 3 inches in height and the visualization window 10b is approximately 2 inches in height. As indicated in FIG. 1 of the drawings, the width of the visualization window 10b is such that it extends approximately half way around the mixing chamber. In the preferred form of the invention, the mixing chamber 16 has a volume of approximately 3 cubic centimeters and is created by the rotor 14 being approximately 0.1 inch less in diameter then the inner diameter of the housing 10.

In using the apparatus of the invention, materials such as liquids, semisolids, gases, solutions, air, or mixtures thereof are controllably introduced into the mixing chamber through a plurality of circumferentially spaced inlet conduits 30, 31, 32, 33, 34, and 35 that are in communication with the mixing chamber 16 in the manner shown in FIG. 1 of the drawings. The consumable materials are supplied from a plurality of material sources 18a, 18b, 18c, 18d and 18e (FIG. 1) that are interconnected with selected ones of the inlet conduits via a plurality of tubular connector tubes 38. To enable visualization by the consumer of the mixing of the materials within the mixing chamber, the inlet conduits are preferably connected to the mixing chamber on the opposite side of the visualization window 10b. By way of example, in the present form of the invention, the material delivered to the mixing chamber from material source 18c (FIG. 2) comprises a lemon flavored fruit concentrate in liquid form that is mixed with water being delivered to the mixing chamber from material source 18a to provide a consumable beverage. Similarly, a cherry flavored fruit concentrate is delivered from material source 18d and an orange flavored concentrate is delivered from material source 18e. The flow of the liquid concentrate into the mixing chamber via the inlet conduits to uniquely form the solution film viewed by the consumer, is controlled by the solenoid-actuated valves, 40, 41, 42, 43, 44 and 45 that are disposed in the liquid conduits in the manner illustrated in FIG. 1 of the drawings.

In the embodiment of the invention illustrated in the drawings, the apparatus is operated through an interface panel 24 that is operably associated with controller 26. Initial operation is commenced by energizing the motor 20 which causes rapid spinning out of the rotor 14 within the housing. With the rotor rotating at a selected speed of rotation, the desired amount of liquid concentrate is controllably introduced into the mixing chamber via the inlet conduits. The mixing of the liquid concentrate with the water component into a colorful solution is uniquely viewed by the consumer through the visualization window 10b. Following the mixing step, the beverage is discharged from the discharge port 16a and into the receiving container 38 that is supported by a support 40.

Upon removal of the receiving container from the support 40, a cleaning solution, clear water and air under pressure are progressively passed through the mixing chamber via inlet conduits 30, 31, 32, 33, 34, and 35 and discharged via the discharge port 16a into a suitable disposal container.

As indicated in FIG. 1 of the drawings, housing 10, rotor 14, electric motor 20, controller 26, interface panel 24 and support 40 are preferably housed within an enclosure 43 of the character illustrated by phantom lines in FIG. 1. An access pane 43a is provided in enclosure 43 to permit access to the support 40, so that the receiving container can be positioned on and removed from the support 40.

Interface panel 24 includes selection buttons or tabs 60, 61, 62, 63, 64, 65, similar to an automatic teller machine for banking. When a particular selection button is activated a signal is transmitted to the controller 26 to begin the desired sequence. Initially, buttons are first selected to direct appropriate flavor and size combinations. Upon a final selection of flavor and size, the controller 26 is signaled by a selected button, as, for example, button 62 and timed actuating signals are transmitted to motor 20 to begin spinning rotor 14 and to open the valves 40, 41, 42, and 43 so that selected fruit concentrates and water are supplied simultaneously to the mixing chamber 16 to progressively pass by the visualization window 10b and then to discharge into the receiving container 38. It is to be understood that during a normal mixing and dispensing cycle the controller 26 is appropriately programmed to cause the valves to remain open long enough to dispense the appropriate amount of beverage into the receiving, or beverage container 38. After the appropriate amount of beverage has been dispensed, valves 40, 41, 42, and 43 are closed and valve 44 is opened to allow a gas to enter the mixing chamber at a sufficient rate and for a sufficient time as may be necessary to push the bulk of the mixed fluid out of the mixing chamber. This done, valve 44 is closed and motor 20 is de-energized. At this time, the interface panel 24 displays a signal that the product is ready to be collected and the controller 26 sends an appropriate signal to the access pane 43a to open the access pane so that container 50 can be removed. After removal of the container, access pane 43a automatically closes and sends a signal to the controller 26 to once again energize motor 20 and cause controlled rotation of the rotor 14. With the rotor rotating, the controller sends an opening signal to valve 45, thereby permitting a minimal amount of rinse solution to be introduced into the mixing chamber. After a short interval of time, the controller sends a closing signal to valve 45 and an opening signal to valve 44 so as to cause a flow of gas under pressure from source 18f into the mixing chamber sufficient to expel the fluid through valve 45. The expelled fluids then pass through support 40 and into an appropriate drain or receiving container 71 (FIG. 2). This done, the controller closes all valves, signals motor 20 to stop spinning, opens the access pane 43a to permit insertion of another container 50 and finally resets interface panel 24 in a manner to permit commencement of the dispensing cycle for the next customer. The construction, operation and programming of controller 26 and interface panel 24 is well understood and can readily be accomplished by those skilled in the art. Those skilled in the art will also appreciate the controller and interface can be linked to data sharing systems via a local electronic network or world-wide network such as the Internet.

It should be noted that the expelling of the fluid through valves 44 and 45 along with the rapid spinning of the motor 20 tends to pull out any fluids remaining in the inlet conduits and exhaust the fluids through the discharge port so that the flavor of the next beverage portion will be substantially unaffected.

It should be appreciated that the efficient post-production cycle as described in the preceding paragraphs achieves simple cleaning and maintenance of the apparatus, thereby requiring a minimal amount of manual labor to keep the apparatus clean and operational.

Certain changes to the described apparatus may be made when carrying out the methods of the current invention without departing from the scope of the invention. Further, while the invention has been described with particular reference to fruit drinks, it may also be utilized profitably in general to present the mixing of multiple fluid streams comprising gases, liquids, solutions, semisolids, mixtures or combinations thereof to provide a product that contains one component intimately mixed into another component. Further still, while the invention has been described with particular reference to a cylindrical mixing chamber, other mixing chamber designs such as cones or disks may also be utilized profitably to provide a product that contains one component intimately mixed into another component. It is intended that all matter contained in the above description or shown in the accompanying drawings shall be interpreted as illustrative and not in a limiting sense.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. An apparatus operable by a consumer for mixing consumable materials contained within a plurality of material sources, comprising:
    (a) a generally cylindrically shaped housing having a wall defining a generally cylindrically shaped interior chamber, said wall having a viewing window therein and a plurality of circumferentially spaced inlet ports;
    (b) a generally cylindrically shaped rotor closely receivable within said interior chamber for rotation there within, said rotor cooperating with said wall of said housing to define an elongated mixing chamber for mixing the consumable materials to form mixture of consumable materials, said mixing chamber being generally annular shaped in cross-section and having an outlet for discharging there through said mixture of consumable materials;
    (c) an electric motor having a drive shaft connected to said rotor for imparting rotation thereto;
    (d) a plurality of circumferentially spaced apart inlet conduits, each said inlet conduit having an inlet connected to a selected one of said material sources and an outlet connected to a selected one of said plurality of inlet ports;
    (e) an adjustable valve connected to each of said inlet conduits for controlling the flow of consumable material through said inlet conduit;
    (f) a controller operably associated with each said adjustable valve for controllably adjusting each said adjustable valve; and
    (g) an interface panel operably associated with said controller for transmitting signals to said controller based on the input of instructions to said interface panel by the consumer.

2. The apparatus as defined in claim 1 further including an enclosure for enclosing said housing and said electric motor.

3. The apparatus as defined in claim 2 further including a container support connected to said enclosure and disposed proximate the said outlet of said mixing chamber.

4. The apparatus as defined in claim 3 in which said enclosure includes an access panel disposed proximate said container support for permitting access to said support.

5. The apparatus as defined in claim 4 further including a container supported by a said container support for containing said mixture of consumable materials.

* * * * *